Figure 1:
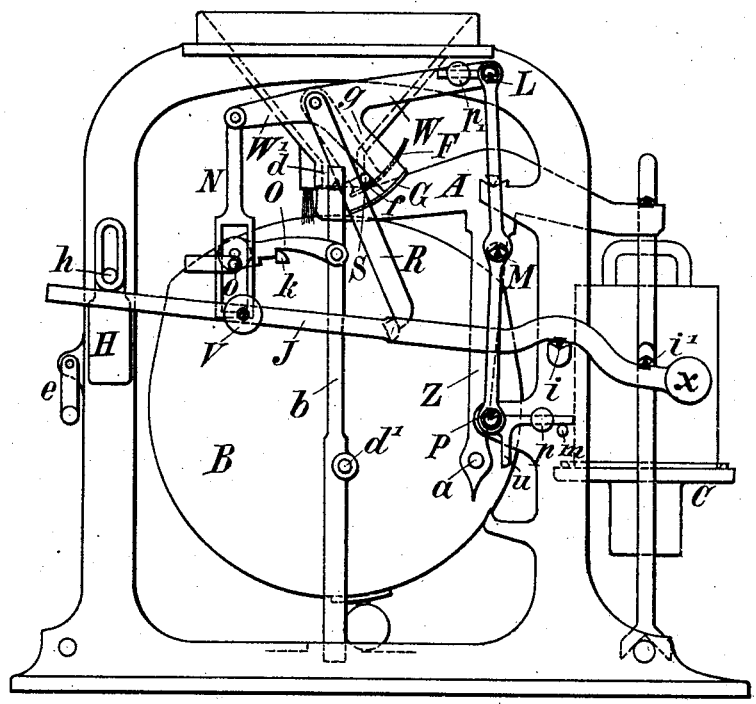
Figure 2:
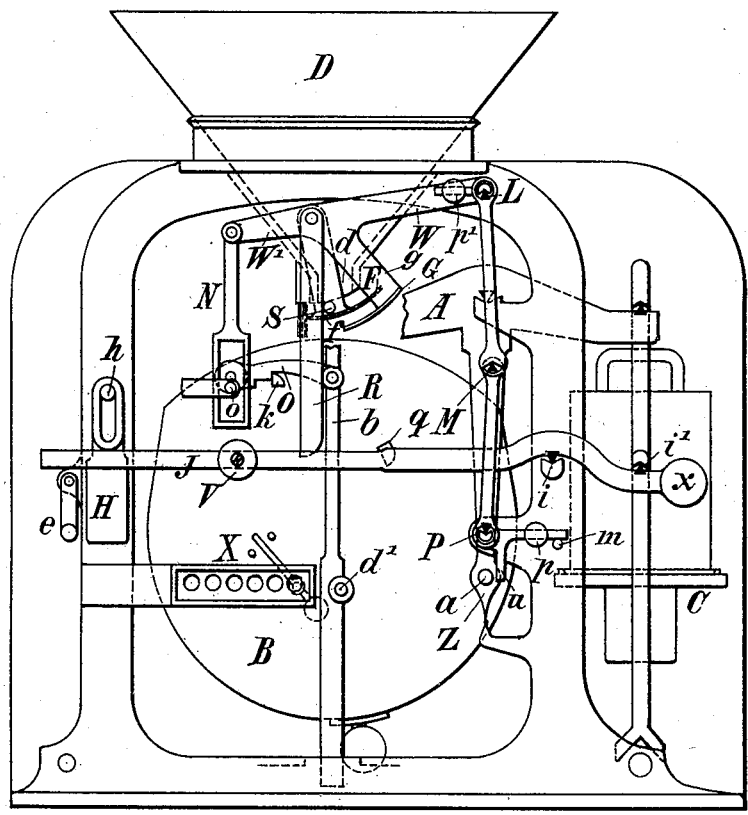
Figure 3:
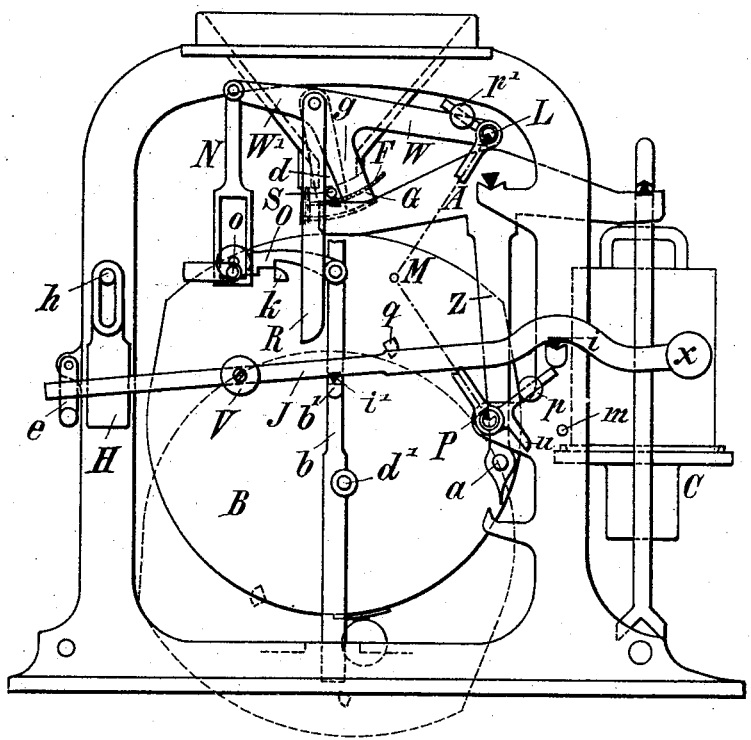
Figure 4:
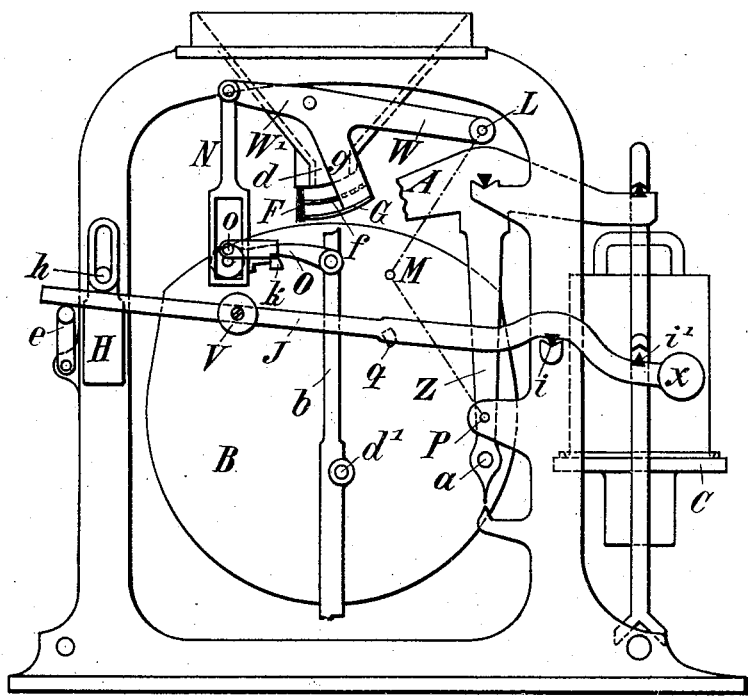

(No Model.) 4 Sheets—Sheet 1.
M. E. REISERT.
GRAIN WEIGHING APPARATUS.

No. 376,965. Patented Jan. 24, 1888.

Witnesses,
C. T. Beet
H. P. Tuttle

Inventor,
Michael Eduard Reisert
By Paine & Ladd,
Attys.

(No Model.) 4 Sheets—Sheet 2.

M. E. REISERT.
GRAIN WEIGHING APPARATUS.

No. 376,965. Patented Jan. 24, 1888.

Witnesses,
C. J. Bell
H. P. Tuttle

Inventor,
Michael Eduard Reisert
By Paine & Ladd,
Attys.

(No Model.) 4 Sheets—Sheet 3.
M. E. REISERT.
GRAIN WEIGHING APPARATUS.

No. 376,965. Patented Jan. 24, 1888.

Witnesses,
C. T. Bell
H. P. Tuttle

Inventor,
Michael Eduard Reisert
By Paine & Ladd,
attys.

(No Model.) 4 Sheets—Sheet 4.

M. E. REISERT.
GRAIN WEIGHING APPARATUS.

No. 376,965. Patented Jan. 24, 1888.

Witnesses,
C. J. Bell
N. P. Tuttle

Inventor,
Michael Eduard Reisert
By Paine & Ladd
atty's.

UNITED STATES PATENT OFFICE.

MICHAEL EDUARD REISERT, OF HENNEF, PRUSSIA, GERMANY.

GRAIN-WEIGHING APPARATUS.

SPECIFICATION forming part of Letters Patent No. 376,965, dated January 24, 1888.

Application filed December 30, 1886. Serial No. 222,999. (No model.) Patented in Belgium June 5, 1886, No. 73,380, and in Italy June 30, 1886, No. 20,039.

*To all whom it may concern:*

Be it known that I, MICHAEL EDUARD REISERT, a subject of the German Emperor, and a resident of Hennef, in the Kingdom of Prussia and German Empire, have invented certain new and useful Improvements in Weighing Apparatus, (for which I received Italian Patent No. 20,039, dated June 30, 1886, and Belgian Patent No. 73,380, dated June 5, 1886,) of which the following is a specification.

My invention relates to improvements in weighing apparatus which weigh automatically the material filled therein and register the weight thus stated; and the object of my improvements is to secure the greatest correctness in weighing and the exact working of the apparatus. I attain this object by the mechanism illustrated in the accompanying drawings, which show side elevations, partly in section, of a weighing apparatus constructed according to my invention, and indicate different positions of the mechanism, more particularly referred to hereinafter.

In the accompanying drawings, forming part of this specification, Figures 1, 2, 3, and 4 are side views of a weighing apparatus embodying my improvements, moving parts in each of the figures being represented in different positions to better illustrate the operation of my invention.

Similar letters refer to similar parts throughout the several views.

A is the scale-beam; B, the receptacle for receiving the material to be weighed; C, the weight. The material to be weighed enters through the hopper D into the receptacle B, which, when exactly filled, empties itself automatically. The number of evacuations of the receptacle B are registered by the counter X. Beneath the hopper D oscillate two flaps, F and G. The upper one serves to reduce, shortly before the evacuation of the receptacle B, the supply-openings to small slits $f$, arranged in the said flap. The lower one, G, stops entirely the supply of material.

The filled receptacle is emptied by tilting over. When the receptacle returns into the upright position, the projection $q$, attached thereon, presses upon the arm R, which presses upon the pin S of the flap F. As the latter presses upon the arm $g$ of the flap G both flaps F and G will be opened by the returning receptacle. The lug $k$ of the receptacle engages into the hook O, pivoted to the suspension-rod $b$, thus arresting the receptacle in the upright position. The flap G is connected with an arm, W, and this arm with a toggle, L M P, which is straightened by the raising flap G and bent by the influence of the counter-weights $p$ and $p'$ toward the right-hand side so far as the stop $m$ will allow it. A lever, J, pivoted upon knife-edges $i$, either engages by the knife-edge $i'$ under the weight C, Figs. 1 and 2, or overcharges by the knife-edge $i'$ the suspension-rod $b$ of the receptacle B, Fig. 3, and is provided at the other end with the counter-weight H.

The above described position of the working parts is illustrated by Fig. 1. In this position the material entering through the channel $d$ and the lever J, charged by the weight H, influences the scale-beam A. After sufficient material has been introduced into the receptacle B as to equipoise the balance, the receptacle B descends until the weight H rests upon the pin $h$. The balance therefore comes to a rest again when the weight H is supported by the pin $h$; but during this short motion the projection $q$ becomes free of the lever R, thus allowing the said lever and the flap F, resting thereon, by means of the pin S, to drop and to bar the supply-opening up to the slits $f$ in the flap F, Fig. 2. Through the slits $f$ of flap F now enters only so much of the material into the receptacle B as to equipoise the scale-beam and to get it into motion again. At this repeated motion of the scale-beam the pin $a$, attached to the hand Z of the beam, pushes in the arm $u$ of the toggle-piece M P, and thereby causes the toggle L M P to bend toward the left-hand side, whereby the flap G loosens its support, drops, and thus stops entirely the supply of material.

With the arm W and the flap G is rigidly connected the arm W', whereto the rail N is suspended. As the arm W' is raised rapidly when the toggle-joint L M P is bent, the rail N lifts the hook O from the projection $k$ of the receptacle, thus permitting the latter to tilt over and to pour out its contents, Fig. 3.

As before described, the overcharging-weight H rests upon the pin $h$ after the upper supply-flap, F, has been closed. Now, when through the slits $f$ of the flap F so much material did enter into the receptacle B as to equipoise again the scale-beam, the influence of the weight H upon the balance did cease, and there is only still the influence of the lever J. This action of the lever J upon the balance is very important, as will be understood from the following.

The arms of the scale-beam A are of equal length, the receptacle B and the weight C are of an equal weight, and the charges of the receptacle are to be exactly as heavy as the weights placed on the weight C. In order that the material which is on the way between the supply-hopper and the receptacle B after the hopper has been entirely closed should not form a surplus part, but an integral one, of the quantity of material balancing the weight of the scale-pan C, either the receptacle B is overcharged by the arrangement of the lever J, Fig. 3, or the scale C is relieved in a similar manner, Figs. 1 and 2. For that purpose the lever J is pivoted upon knife edges $i$ and provided with an adjustable counter-weight, V, which is placed thereon, according to the quality of the material to be weighed. In the construction Fig. 3 the lever J, partly balanced by the counter-weight $x$, presses, by means of the knife-edge $i'$, upon the projection $b'$, arranged on the receptacle B, and thereby overcharges this side of the scale in correspondence with the position of the weight V.

In the other construction an equal effect is obtained by the rear arm of the lever J bearing under the scale-arm of the beam by means of the knife-edge $i'$, and thus overcharging the front arm by the pressure of the weight V. In both constructions the action of the lever J upon the beam should be of such an intensity as to overcome the resistance caused by the arm $u$ against the pin $a$ of the beam during the bending motion of the toggle-joint L M P, and to produce the bending of the toggle-joint so prematurely as to balance the material, which drops upon the material filled into the receptacle B after the scale-beam equipoises.

For ascertaining the correctness of the charges of the receptacle B corresponding with the weight in the scale-pan C without discharging the receptacle, the pin $o$, attached to the hook O, is turned upward, thus preventing the lift of the hook N and the emptying of the receptacle B after it has been filled, and the lever J and the weight H are supported by upward turning the crank $e$. Consequently the scale-beam will be out of contact with all mechanisms, and therefore the hands Z can indicate freely, Fig. 4. When in such case the hands Z do not balance exactly, the weight V of the lever J is adjusted correspondingly, and the next charge is then controlled again.

Several features have been described and illustrated in the present case which are claimed or covered in a separate pending application of mine, and serially numbered 236,970, filed May 3, 1887, to which application attention is directed. The notable features of similarity are the tilting scale-beams and receptacle and the flaps F and G and devices for controlling the same.

Having now particularly described and ascertained the nature of my said invention and in what manner the same has to be performed, I claim—

1. In an automatic weighing apparatus, the combination, with the receptacle B and the upper supply-flap, F, of the scale beam A, with the lever J, and the counter-weight H, for the purpose of causing the descent of said receptacle required for closing the said supply-flap, substantially as set forth.

2. In automatic weighing apparatus, the combination of the scale-beam A, with the lever J, the toggle-joint or articulated lever L M P, the arm W, and the flap G, for the purpose of closing the flap G so prematurely as to balance the material which drops upon the material already filled into the receptacle after the scale-beam equipoises.

3. In automatic weighing apparatus, the combination of the arresting devices, substantially as described, scale-beam A, with the toggle-joint L M P and the arms W and W', and link N, for the purpose of disengaging the arresting device of the weighing-receptacle and of permitting the latter to be emptied thereby.

In testimony that I claim the foregoing as my invention I have signed my name, in presence of two witnesses, this 16th day of October, 1886.

MICHAEL EDUARD REISERT.

Witnesses:
ALEXANDER SPECHT,
DIEDRICH PETERSEN.